United States Patent
Koyama et al.

(10) Patent No.: US 6,470,712 B2
(45) Date of Patent: Oct. 29, 2002

(54) METHOD OF CHANGING THE SURFACE OF A GLASS SUBSTRATE CONTAINING SILVER, BY USING A LASER BEAM

(75) Inventors: Tadashi Koyama; Keiji Tsunetomo; Masahiro Oikawa; Kenjiro Hamanaka, all of Osaka (JP)

(73) Assignee: Nippon Sheet Glass Co., Ltd. (JP)

( * ) Notice: Subject to any disclaimer, the term of this patent is extended or adjusted under 35 U.S.C. 154(b) by 0 days.

(21) Appl. No.: 09/789,090

(22) Filed: Feb. 20, 2001

(65) Prior Publication Data

US 2002/0017116 A1 Feb. 14, 2002

Related U.S. Application Data

(62) Division of application No. 09/155,125, filed as application No. PCT/JP97/00822 on Mar. 14, 1997, now Pat. No. 6,220,058.

(30) Foreign Application Priority Data

Mar. 25, 1996 (JP) ............................................. 8-68440
Mar. 25, 1996 (JP) ............................................. 8-68455
Jul. 5, 1996 (JP) ............................................ 8-176124

(51) Int. Cl.[7] ........................ C03B 37/018; C03C 25/00
(52) U.S. Cl. ........................... 65/392; 65/30.13; 65/61; 65/102; 65/106; 65/386; 65/400; 219/121.69; 219/121.74; 219/121.75; 219/121.79
(58) Field of Search ..................... 65/30.13, 61, 102, 65/106, 386, 392, 400; 219/121.69, 121.74, 121.75, 121.79

(56) References Cited

U.S. PATENT DOCUMENTS 3,604,778 A * 9/1971 Burckhardt
4,022,602 A 5/1977 Pavlopoulos .................. 65/102
5,053,171 A 10/1991 Portney et al. ............... 264/1.4
5,634,955 A 6/1997 Araujo et al. ................. 65/17.2
5,656,186 A * 8/1997 Mourou et al.
5,665,136 A * 9/1997 Komachi
5,910,256 A 6/1999 Tsunetomo et al. ........... 216/24
5,951,731 A 9/1999 Tsunetomo et al. ............ 65/61
5,991,049 A 11/1999 Tanaka et al. ............... 356/445

FOREIGN PATENT DOCUMENTS

| EP | 0079473 | 5/1983 | ........... C03C/23/00 |
| EP | 0690028 A1 | 1/1996 | ........... C03B/23/02 |
| GB | 2160196 A | 12/1985 | ........... C03B/19/00 |
| JP | 54-28590 | 3/1979 | ............. H01S/3/00 |
| WO | 96/27815 | 9/1996 | ........... G02B/27/10 |

OTHER PUBLICATIONS

"Product News", *Sprechsaal*, vol. 121, No. 9, pp. 708–714, (1988).

Amosov, A. V., et al., "The Behavior of Synthetic Silica Glass Upon Exposure to Higt–Power KrF and ArF Laser Radiation", *Glass Physics and Chemistry*, vol. 20, No. 1, pp. 67–72, (Jan./Feb. 1994).

Bahr, J., et al., "Index–distributed planar microsenses for three–dimensional micro–optics fabricated by silver–sodium ion exchange in BGG35 substrates", *Applied Optics*, vol. 33, No. 25, pp. 5919–5924, (Sep. 1, 1994).

Mukhina, L.L., et al., "Laser Pulse Damage on the Surface of Ion Exchange Treated Glass", *Glass Physics and Chemistry*, vol. 19, No. 3, pp. 269–272, (Jun. 1993).

* cited by examiner

Primary Examiner—Michael Colaianni
(74) *Attorney, Agent, or Firm*—Schwegman, Lundberg, Woessner & Kluth, P.A.

(57) ABSTRACT

A laser processing method for removing glass by melting, evaporation or ablation from sheet-like glass substrate for forming microscopic concavities and convexities. Diffraction grating and planar microlens array obtained thereby.

11 Claims, 16 Drawing Sheets

10 μm

METHOD OF CHANGING THE SURFACE OF A GLASS SUBSTRATE CONTAINING SILVER, BY USING A LASER BEAM

This application is a Divisional of U.S. patent application Ser. No. 09/155,125, filed on Sep. 22, 1998, (the '125 Application) now U.S. Pat. No. 6,220,058 which is a 371 of PCT/JP97/00822 filed Mar. 14, 1997. The '125 Application is incorporated herein by reference.

TECHNICAL FIELD

The present invention relates to a laser processing method for glass substrates, and a diffraction grating and a microlens array which can be obtained therefrom.

BACKGROUND ART

Silicate glass composed primary of $SiO_2$ is highly transparent and can easily be molded (deformed) at high temperatures. Sheets of silicate glass, which have been formed with holes or concavities and convexities by microscopic topographic processing, are widely used as glass substrates for optical components used for optical communications and display devices.

In order to make a hole in a sheet of silicate glass according to microscopic topographic processing, it has been the general practice to process the sheet of silicate glass with wet etching (chemical etching) using an etchant of hydrofluoric acid or the like, or dry etching (physical etching) such as reactive ion etching.

However, wet etching suffers problems with respect to management and processing of the etchant. Dry etching requires pieces of equipment such as a vacuum container, needs a large-scale apparatus, and is not efficient because a pattern mask has to be produced by complex photolithography.

Laser beams have an intensive energy, and have heretofore been used to increase the temperature of a surface of a material to which the laser beam is applied thereby to ablate or evaporate a portion of the material to which the laser beam is applied, for processing the material in various ways. Since the laser beam can be focused into a very small spot, it is suitable for microscopic topographic processing of a material.

Then, in Japanese Patent Laid-Open No. 54-28590 (1979), there is disclosed processing of a glass substrate surface by radiating it with a laser beam while moving a table in X-Y directions, on which table is fixedly mounted the glass substrate already heated to 300 through 700° C.

Although, as mentioned above, the concavities and convexities of desired shape can be formed on the glass surface by moving the table in X-Y directions, the concavities and convexities cannot be created if it is for instance a microscopic pattern such as of a diffraction grating.

Moreover, the movement of the table generates dust, which results in defects in the products and decreases productivity thereof.

As another method of manufacturing a planar microlens array etc., a stamper method has been already known, in which lens material is injected into a mold frame and the molded patterns are transplanted on the glass substrate and baked, however, it requires accurate positioning during the pattern transplanting process and the baking process, and it takes time.

As another method of manufacturing a planar microlens array etc., it has been proposed to obtain a convex lens by forming concavities arc shaped in cross-section on the glass substrate surface with a wet etching and injecting plastic material of high refractive index into the formed concavities, thereby forming the convex lens with the concavities, however, the wet etching has the problems as mentioned above.

Then, it is conceivable to form the concavities into which the plastic of high refractive index is injected by radiating a laser beam through a mask, however, since the laser beam has tendency of going straightforward and it has almost same intensity within area of one spot after passing through the openings of the mask, then the wall of the concavity formed on the glass substrate comes to be about perpendicular to the glass substrate, whereby it is impossible to obtain the cross-section of perfectly continuous arc shape. Therefore, it cannot be mounted onto apparatus requiring extremely high accuracy, such as a liquid crystal display, as it is, and it needs more or less treatment by wet etching and takes time.

Laser beams are generated by an infrared laser such as a $CO_2$ laser, a Nd:YAG laser, a laser comprising aNd:YAG laser combined with a wavelength conversion capability for producing a laser beam whose wavelength ranges from a near-infrared region through a visible region to an ultraviolet region, and an ultraviolet laser such as an excimer laser such as an ArF or KrF laser. If the $CO_2$ laser of long wavelength is used, cracking due to thermal strain occurs violently. If the ultraviolet KrF laser (wavelength of 248 nm) is used, cracking occurs around the area where the laser beam is applied, therefore it is not suitable for the microscopic topographic processing. Thus, the use of the ArF excimer laser of wavelength of 193 nm is optimum as the laser beam for glass processing, however, even when such an ArF excimer laser is used, because of absorption by air, it is needed to replace the air with absorption-free gas such as Ar, etc. or to keep a vacuum in order to allow the laser beam to reach as far away as possible.

DISCLOSURE OF THE INVENTION

The present invention has been made to resolve the conventional problems mentioned above, and an object thereof is to provide a laser processing method able to form microscopic concave patterns on a glass substrate surface with accuracy and within a short time period.

Another object thereof is to provide a laser processing method to form a large number of the concavities having a curved line cross section on the glass substrate surface.

Further another object thereof is to provide a laser processing method to form a large number of the concavities on the glass substrate surface without movement of the glass substrate and by changing the light path.

Furthermore another object thereof is to obtain a diffraction grating and a microlens array in accordance with the above method.

For achieving the object mentioned above, according to the present invention, a laser processing method for a glass substrate comprises: radiating the laser beam on the glass substrate, absorbing energy of the laser beam into the glass substrate, and removing the glass by melting, evaporation or ablation due to the energy, wherein microscopic concavities and convexities are formed on a surface of the glass substrate, by partially varying the spacial distribution of the intensity of the laser beam applied upon the surface of the glass substrate, thereby removing a greater amount of glass where the intensity is stronger, and less where the intensity is weaker.

A diffraction grating or a microlens array which can be incorporated into an optical coupler, a polariscope, a spectroscope, a reflector or a mode transducer, etc., can be manufactured by using a laser beam having periodical or regular distribution in intensity.

The laser beam having the regular intensity distribution can be obtained by a phase mask or interference between two laser beam, and the periodical cross-sectional configuration of the concavities and convexities formed on the surface of the glass substrate can be controlled by the pulse energy of the laser beam. And, the laser beam having the regular intensity distribution can be obtained by using a mesh-like mask, etc.

For achieving the another object mentioned above, according to the present invention, a laser processing method for a glass substrate comprises: disposing a mask at the focus position on the incident side of a lens, disposing the glass substrate at the focus position on the exit side of said lens, radiating the laser beam on the mask thereby forming a Fourier transform image on a surface of said glass substrate at the focus position of the exit side of said lens, absorbing energy of the Fourier transform image into the glass substrate, and removing the glass by melting, evaporation or ablation due to the energy, thereby forming a plurality of concavities periodically distributed on said glass substrate.

Here, the laser beam penetrating the openings of the mask shows a rectanglar intensity distribution in which the intensity is nearly equal at the central and the peripheral portions. However, the Fourier image of the laser beam penetrating said mask shows a sinusoidal intensity distribution which has greater value at the central portion and a lesser value on the peripheral portion thereof. As the result of this, it is possible to form a number of concavities spreading on the surface of the glass substrate in two dimensions, with smoothly curved lines including arc lines in the cross sectional view. For example, applying it to a planar microlens array, it is possible to form a convex lens with high accuracy.

Similarly for achieving the another object mentioned above, according to the present invention, a laser processing method for a glass substrate comprises: coinciding the focal point on the exit side of a first lens with the focal point on the incident side of a second lens, disposing a first mask at the focal point on the incident side of said first lens, disposing a second mask at focal point on the exit side of said first lens, disposing a glass substrate at the focal point on the exit side of said second lens, radiating the laser beam on the first mask thereby forming a Fourier transform image at the focal point on the exit side of said first lens as well as forming a part of a Fourier transform image on a surface of said glass substrate disposed at the focal point on the exit side of said second lens, absorbing energy of the formed image into the glass substrate, and removing the glass by melting, evaporation or ablation due to the energy, thereby forming a plurality of concavities periodically distributed on said glass substrate.

The pattern of the concavities formed on the glass substrate surface by such a method is coincident with that of the first mask, but the cross-sectional configuration thereof is curved smoothly. And, the power of the image can be adjusted by changing the focal length of the two lenses.

Here, the Fourier transform image is formed on the glass substrate by disposing the glass substrate at the focal point on the exit side of the lens, however, according to the present invention, it is also possible to dispose the glass substrate away from the focal point. In this case, not the Fourier transform image, but a periodical structure differing from that of the mask is transferred.

As the masks, not only are a mask having openings, such as a copper sheet (a copper mesh) on which are arranged rectangular or circular holes in two dimensions, and a mask obtained from patterning of layers by metal evaporation on a fused quartz substrate applicable, but also a mask of so called phase type, which gives phase shift to the beam is applicable.

Further for achieving the another object mentioned above, according to the present invention, a laser processing method for a glass substrate comprises: radiating the laser beam on the glass substrate, absorbing energy of the laser beam into the glass substrate, and removing a part of the glass by melting, evaporation or ablation due to the energy, wherein microscopic concavities are formed on a surface of said glass substrate by changing the optical path of the laser beam with optical path changing means, thereby moving a spot position of the laser beam radiated on the surface of said glass substrate.

Here, the optical path changing means can be constructed with a first mirror for moving the spot position of the laser beam in a X-direction on the surface of said glass substrate, and a second mirror for moving the spot position of the laser beam in a Y-direction on the surface of said glass substrate. For the mirrors, it is preferable to use a galvano mirror which turns through a small amount of angle depending on the current conducting through it.

Furthermore, in the conventional art, the laser beam which is applicable to glass processing is limited to an ArF excimer laser of wavelength of 193 nm, and the device is big and complicated because of the necessity of replacement with non-absorbing gas, such as Ar or vacuum. However, according to the present invention, it is experimentally ascertained that a laser beam having a wavelength longer than the above-mentioned is applicable to glass processing, by introducing silver into the glass in the form of Ag atoms, Ag colloid or Ag ions, without cracking or breakage, and the trace of the laser radiation is very smooth.

However, in case that the glass contains silver in uniform concentration, such as the conventional light sensitive glass and/or antibacterial glass, no increase in processability can be found, therefore, it is necessary that it has a concentration slope of the silver showing the highest concentration at a side surface to be processed and gradually decreasing to the other side surface thereof.

This is according to the mechanism shown in FIG. 1 and will be explained below.

As shown in FIG. 1($a$), the laser beam is applied onto the surface having the highest Ag ion concentration. Then, as shown in FIG. 1($b$), the Ag ion is resolved to be a colloid (very fine particles of Ag) on the surface having the highest Ag ion concentration of the glass substrate. The Ag colloid particles absorb energy of the laser beam, as shown in FIG. 1($c$), and melting, evaporation or ablation occurs, whereby the glass of the surface layer is removed. After removing the glass of the surface layer, the same phenomenon occurs in subsequent glass layer, and concavities or penetrating holes are formed at the last as shown in FIG. 1($d$).

In this way, since the glass is gradually removed from the top surface of the glass substrate, therefore cracking or breakage is hard to occur. On the contrary to this, in the glass substrate containing silver in uniform concentration or no silver, ablation occurs inside of the glass substrate, and therefore cracking or breakage occur easily.

DETAILED DESCRIPTION OF PREFERRED EMBODIMENTS

Hereinafter, the embodiments of the present invention will be explained in detail.

EXAMPLE 1

Figure 1A:
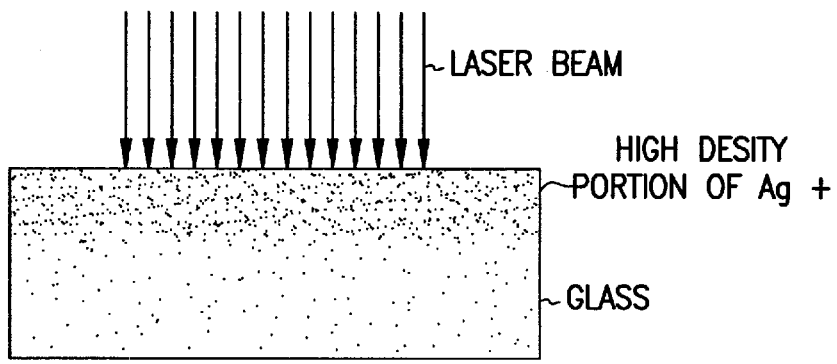
FIGS. 1(a) to (d) are drawings for explaining the basic idea of a laser processing method relating the present invention.
Figure 1B:
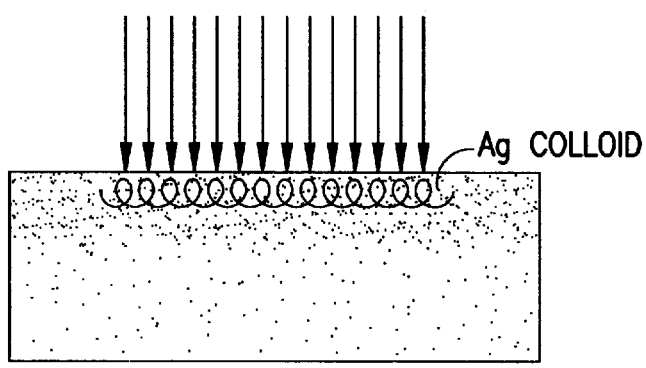
Figure 1C:
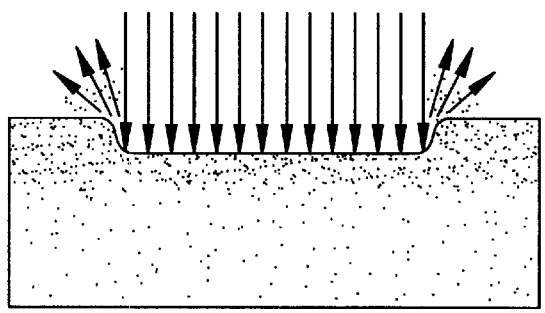
Figure 1D:
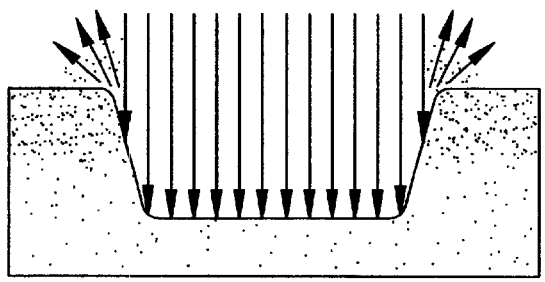
Figure 2:
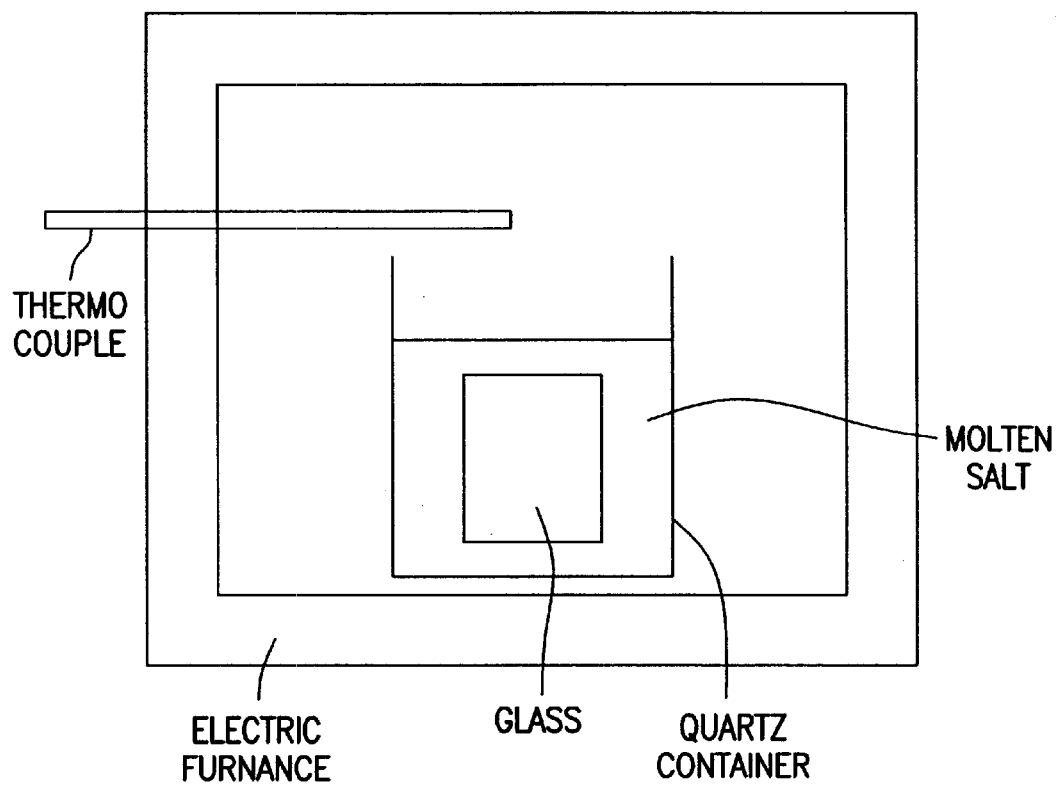
FIG. 2 is a block diagram of a device for use in ion exchange.

An ion exchange was conducted using a device as shown in FIG. 2. A glass substrate to be processed was in the form of a sheet of silicate glass having a thickness of 2 mm and composed mainly of $SiO_2$ and containing $Al_2O_3$, $B_2O_3$, $Na_2O$, F, etc. A molten salt placed in a quartz container was a mixture of 50 mol % of silver nitrate and 50 mol % of sodium nitrate.

Specimens of the glass substrate were immersed in the molten salt in the quartz container for 12 minutes. The molten salt was kept at 285° C. in an electric furnace, and the reactive atmosphere was air.

Na ion (one-valence positive ions) in the surface of the glass substrate are eluted, diffusing Ag ions in the molten salt into the glass. The thicknesses of the layers into which the Ag ions were diffused, as measured by a microanalyzer, were about 5 mm.

Figure 3:
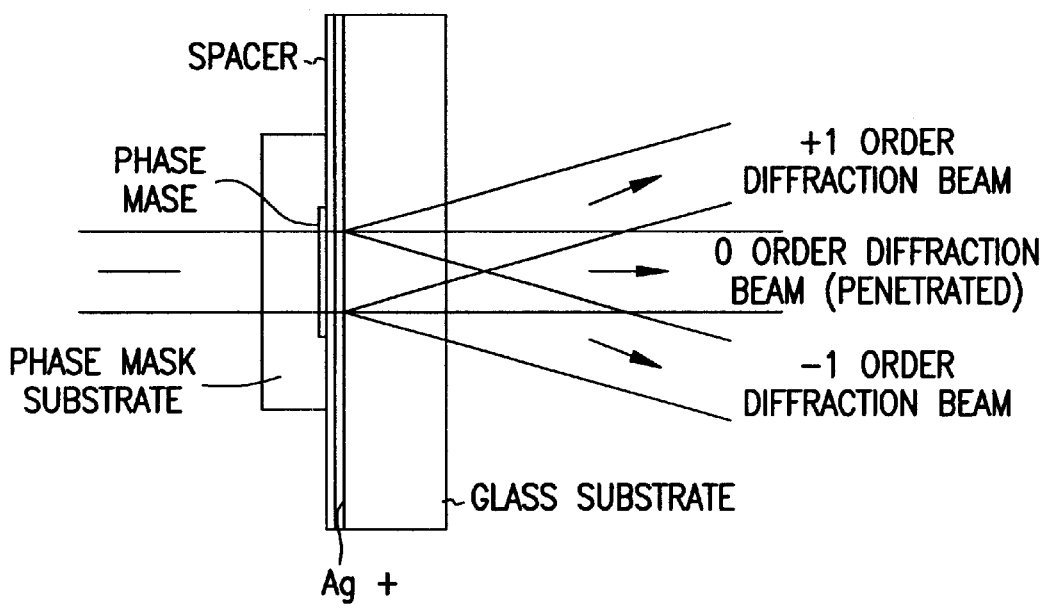
FIG. 3 is an outline drawing of a device for producing a diffraction grating in accordance with the method of the present invention.

Then, a diffraction grating was manufactured by using the device shown in FIG. 3. Concretely describing, on the surface of the glass substrate, which surface is treated by the ion exchange, is positioned a substrate including a phase mask, on which mask the diffraction grating is formed, via a spacer, and then the laser beam is radiated thereupon.

Figure 4A:
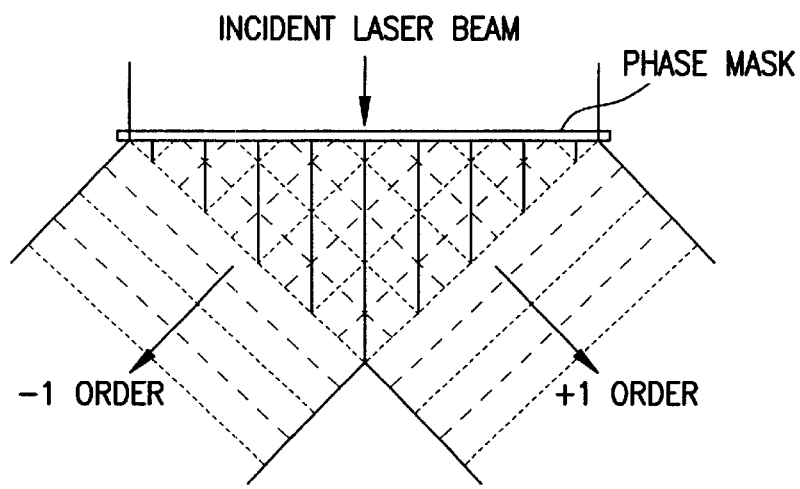
FIG. 4(a) is drawing for explaining the function of a phase mask.

Upon incidence of the laser beam onto the phase mask, as shown in FIG. 4(a), primarily the diffraction beams of +1 and −1 of order exit, and the periodical distribution in intensity of the light beam can be obtained by the interference between those diffraction beams in the vicinity of the pole on the exit side of the phase mask. And, the frequency of the interference, if the laser beams are parallel on the incident side, coincides with the spacing of the diffraction grating of the phase mask. Here, the phase mask, having a spacing of the diffraction grating: 1055 nm, depth of the diffraction grating: about 250 nm, size: 10 mm×5 mm (made by QPS Technology Inc., Canada) is used, and therefore, intensity distribution of the beam having frequency of around 1055 nm can be obtained.

Figure 4B:
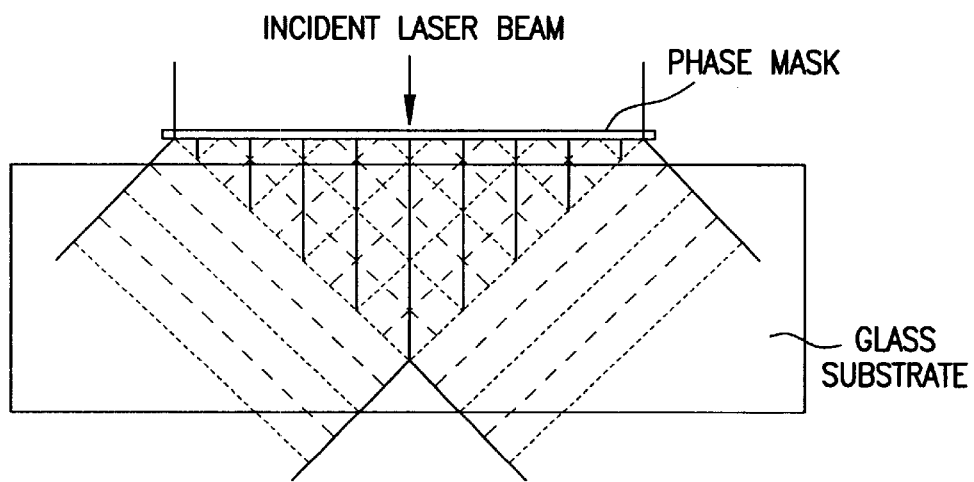
FIG. 4(b) is a drawing which shows the condition under which a laser beam is applied onto a glass substrate through the above phase mask.
Figure 4C:
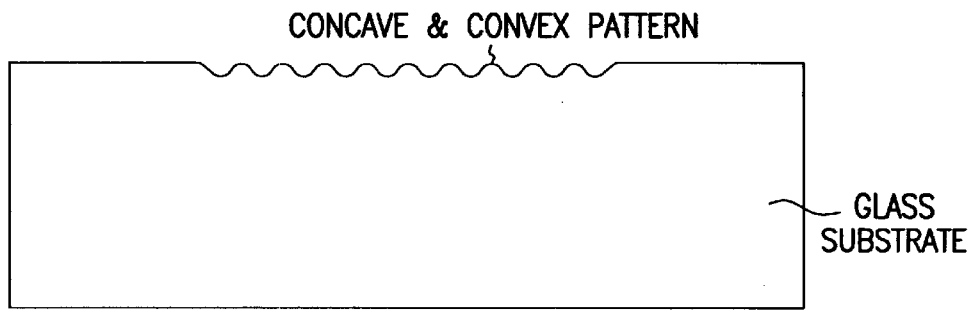
FIG. 4(c) is a drawing which shows the glass substrate treated by the laser processing.

On the region where the periodical intensity distribution is formed, as shown in FIG. 4(b), the glass substrate is set. As the result thereof, as shown in FIG. 4(c), glass is evaporated or ablated depending on said periodical light intensity, and a diffraction grating having a frequency equal to that of the light intensity is formed on the glass substrate.

Here, the laser beam which is used is light beam of third high harmonic wave of the Nd:YAG laser of 355 nm. The pulse width is about 10 nsec, the repetition frequency is 5 Hz. And, energy per one pulse of the laser beam is able to be adjusted by changing the timing of the Q switch of the laser. In this embodiment, the laser which is used radiates a laser beam of about 90 mJ maximum pulse energy and about 5 mm beam diameter.

The evaporation or ablation by the laser beam is, generally, non-linear, thus, the evaporation does not occur until the laser beam exceeds a certain intensity. In the case of the glass substrate used in this embodiment, with a laser of wavelength of 355 nm, the ablation does not occur until the intensity increases to more than 3 to 4 $J/cm_2/pulse$ in energy density. As mentioned above, because the energy density of the laser beam applied is about 0.46 $J/cm_2$, the ablation will not occur as it is. Therefore, in order to increase the energy density, the laser beam is focussed by a lens having focus distance of 250 mm, thereby obtaining beam size of about 2 mm on the glass substrate.

In the concrete radiation method of the embodiment, first, the laser beam is decreased in the intensity, and the optical path is adjusted so that it enters nearly perpendicular from the substrate side of the phase mask. After that, the energy of the laser beam is gradually increased by changing the timing of the Q switch of the laser beam source. The ablation of the glass first occurs when the optical energy comes to about 80 mJ/pulse, and keeping this condition, 5 pulses of the laser beam are radiated, then the radiation of the laser beam is stopped.

Figure 5A:
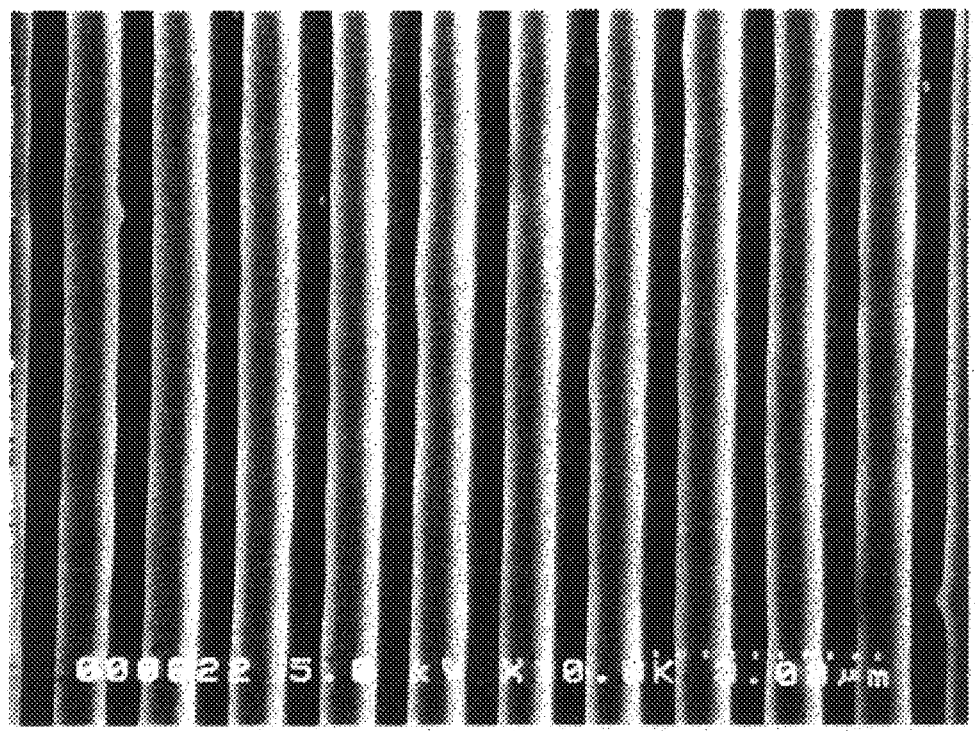
FIG. 5(a) is a picture of the surface of a diffraction grating, observed by a scanning type electron microscope (×10,000)
Figure 5B:
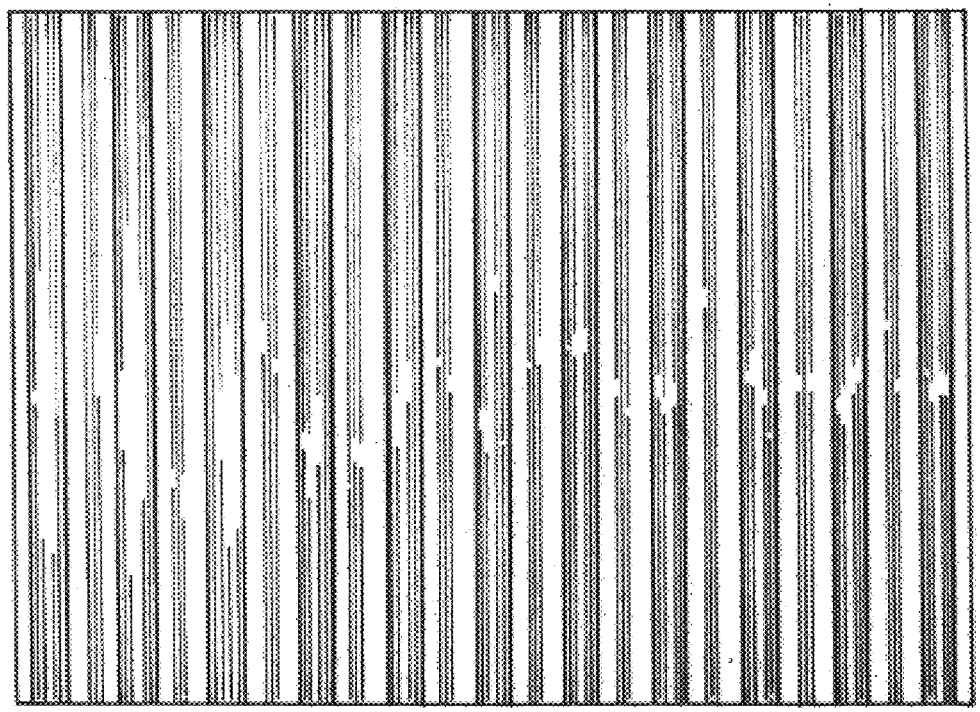
FIG. 5(b) is a drawing which is made on the basis of the above picture.
Figure 6A:
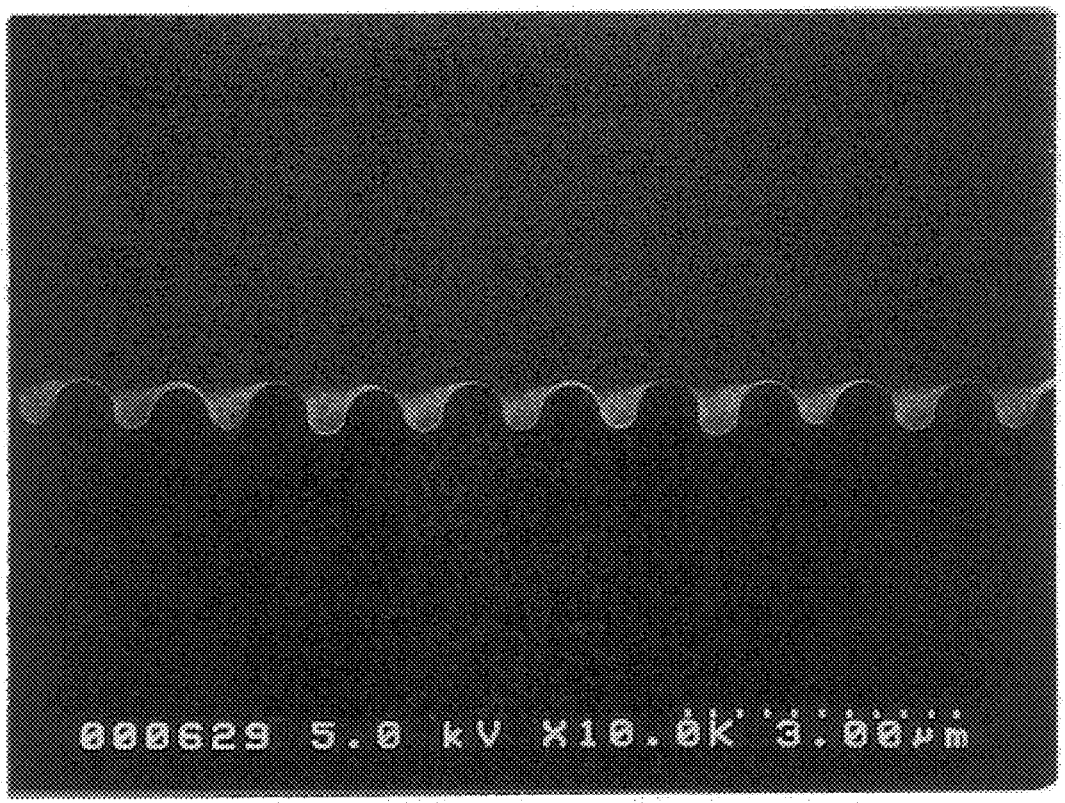
FIG. 6(a) is a picture of the cross section of the diffraction grating, observed by a scanning type electron microscope (×10,000)
Figure 6B:
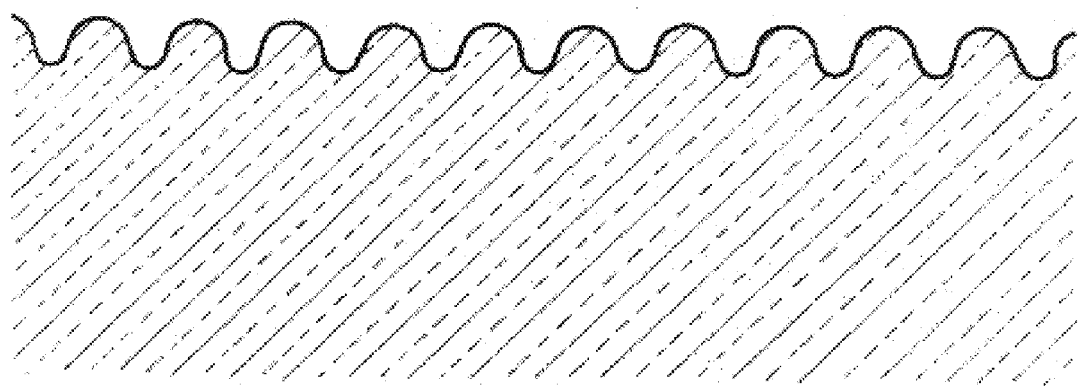
FIG. 6(b) is a drawing which is made on the basis of the above picture.

The configuration of the diffraction grating formed as mentioned above is shown in FIG. 5 and FIG. 6. Here, FIG. 5 (a) is a picture of the surface of a diffraction grating, observed by a scanning type electron microscope (10,000 power), FIG. 5(b) is a drawing which is made on the basis of the above picture, FIG. 6(a) is a picture of the cross section of the diffraction grating observed by a scanning type electron microscope (10,000 power), and FIG. 6(b) is a drawing which is made on the basis of the above picture. As is apparent from those drawings, the frequency of the diffraction grating is nearly equal to that of the phase mask which was used, and the configuration of the diffraction grating comes to be curved surface following the constructive frequency of the beam intensity distribution. Moreover, the surface of the diffraction grating is very smooth.

In the above, measurements are made near the center of the diffraction grating, however, since the laser beam intensity is lower than that of the central portion on the peripheral portions thereof, a diffraction grating having a configuration different from that of the central portion is formed. Namely, because the ablation occurs even in the recess portion of the intensity distribution at the central portion of the radiation area of the laser beam (the portion where the beam intensity is highest), the convexities and concavities of the manufactured diffraction grating come to be smoothly curved. On the contrary to this, in the peripheral portion of the laser radiation area (the portion where the beam intensity is low), the ablation occurs only in the projecting portion of the beam intensity distribution, and as the result of this, the configuration becomes trapezium in the cross section. In this instance, since the top surface of the diffraction grating was originally the surface of the glass substrate, it cannot be so smoothed.

As mentioned above, it is ascertained that the diffraction grating changes in the formed configuration, due to the difference in the beam intensity between the central portion and the peripheral portions of the laser beam. Moreover in this embodiment, it is acknowledged that the cross-sectional configuration of the diffraction grating is also changed in the same manner by changing the laser beam intensity itself.

By manufacturing the diffraction grating in this manner, the diffraction grating can be very easily manufactured on the glass with low price, without the necessity of a special vacuum container.

By the way, the distance between the phase mask and the glass substrate is maintained at about 50 mm by a spacer in the present embodiment. This is for the purpose of inhibiting the evaporated materials of the glass substrate surface from adhering on the phase mask as much as possible, and the distance itself is at random. For example, within the area where the light beams of +1 and −1 of the order overlap, the diffraction grating can be manufactured even if the phase mask is closely attached to the glass substrate. In case of radiating the laser on the glass substrate and the phase mask which are put on one another via a quartz plate having thickness of about 150 mm therebetween, the diffraction grating can be manufactured in the same manner of the present embodiment. Since the phase mask can be used repeatedly, it is important to protect it from dirt, and, interposition of the spacer is effective means to do this.

EXAMPLE 2

In this embodiment, in place of using the phase mask which was used in the embodiment mentioned above, the periodical distribution of the intensity is formed by utilizing an interference between two laser beams.

Figure 7:
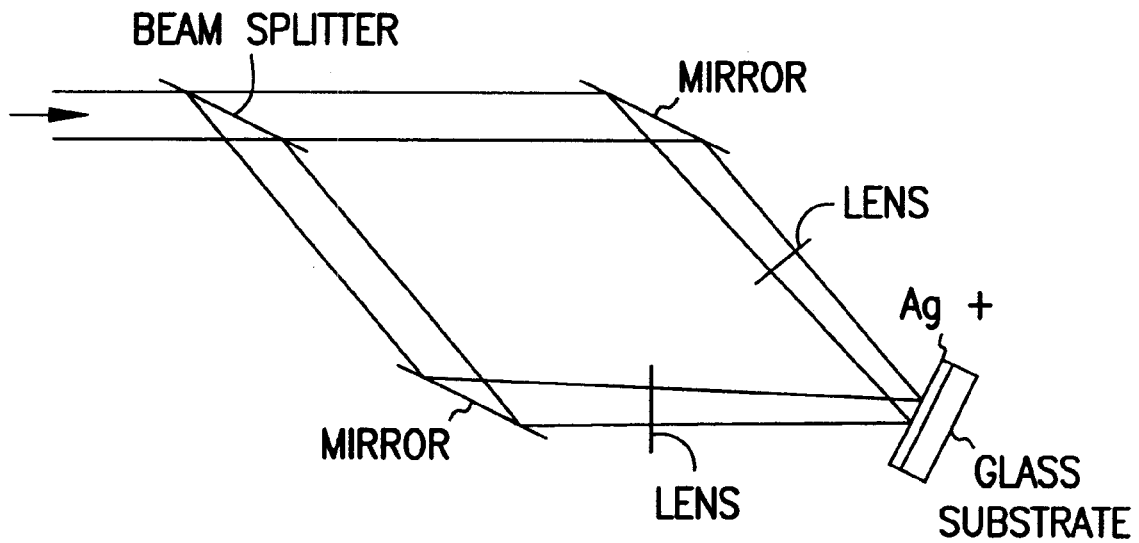
FIG. 7 is a drawing which shows another embodiment of means for effecting periodical distribution in the intensity of the laser beam.

Namely, as shown in FIG. 7, the laser beam is split into two through a beam splitter and put one onto the other again with a certain angle. Then the periodical distribution of light intensity is formed in the portion where the two light beams overlap each other. The frequency is determined by the angle being defined by the two overlapping laser beams.

In this embodiment, the optical system is so constructed that the incident angle of the two laser beams is about 20°. In this case, the frequency of the distribution in the beam intensity is about 1020 nm.

Then, the processable glass of the same kind as that used in the above embodiment 1 is positioned at the portion where the two laser beams overlap, and is radiated with the laser beam. As the result of this, the ablation occurs. The lens in the drawing is used for increasing the energy density on the glass surface, and the energy density when the ablation occurs comes to be a similar value to that of the above-mentioned embodiment.

The frequency of the formed diffracting grating is measured, and the measured value comes to be nearly equal to the predicted value. The cross section is measured or observed by the scanning type electron microscope, and it is ascertained that the diffraction grating having smooth curved surface is formed, the same as the embodiment 1.

Here, there is a difference between the embodiment 1 and the embodiment 2 in the means for forming the periodical intensity distribution, and each of them has its own advantages and disadvantages, respectively.

Namely, the method of using the phase mask, since it is simple in the construction of the optical system and provides good reproducibility, is advantageous when the diffraction grating having the same frequency is produced. On the other hand, when the frequency must be frequently changed, the method using the interference between the two laser beam is advantageous.

EXAMPLE 3

Figure 8:
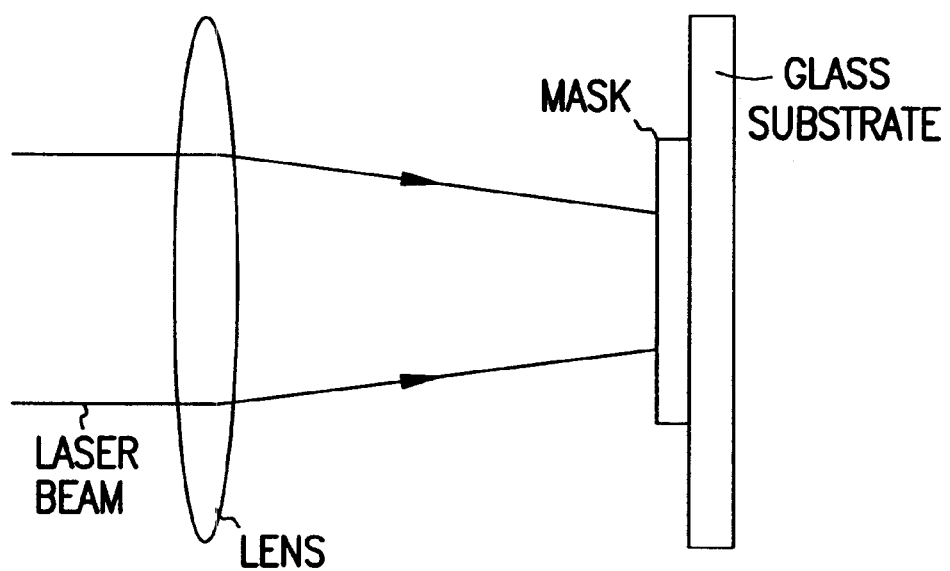
FIG. 8 is an outline drawing of a device for forming a mesh pattern with laser processing on the glass substrate.

As shown in FIG. 8, a mask made of copper and having a mesh pattern is closely attached to the glass substrate, and the laser beam is applied on it. The laser beam is so focused by the lens having the focus distance of 250 mm that it has a beam size of about 2 mm on the glass substrate.

The glass which is used here is the same kind that is processable by the laser and is also used in the above-mentioned embodiment 1. The condition for the diffusing Ag ion into the glass is the same as that of the embodiment 1, except that the temperature of the molten salt is 300° C., and the laser beam which is used here is the second high harmonic of the Nd:YAG laser having wavelength of 532 nm. The pulse width is about 10 nsec, and the repetition frequency is 5 Hz. And, the energy of the laser beam per one pulse can be adjusted by changing the timing of the Q switch of the laser. In the case of the laser which is used in this embodiment, the maximum pulse energy is about 90 mJ and the beam diameter is 5 mm.

In processing the glass substrate by the laser processing, first, the laser beam is decreased in intensity, and the optical path is adjusted so that it enters nearly perpendicular from the substrate side of the phase mask. After that, the energy of the laser beam is gradually increased by changing the timing of the Q switch of the laser beam source. The ablation of the glass is acknowledged when the optical energy comes up to about 4 $J/cm^2$/pulse, and while keeping this condition, 5 pulses of the laser beam are radiated, and then the radiation of the laser beam is stopped.

Figure 9A:
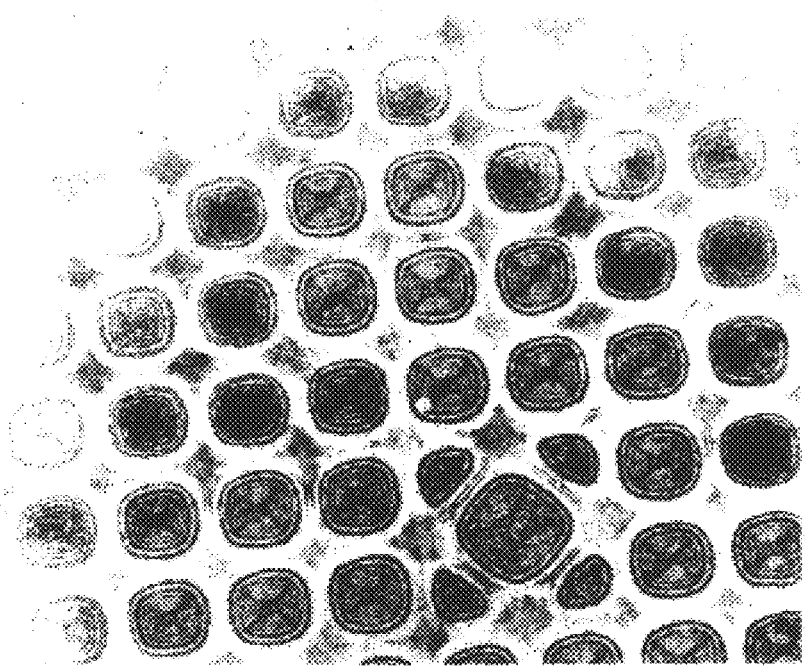
FIG. 9(a) is a picture of the surface of the glass substrate processed by the laser, observed by an optical microscope (×100)
Figure 9B:
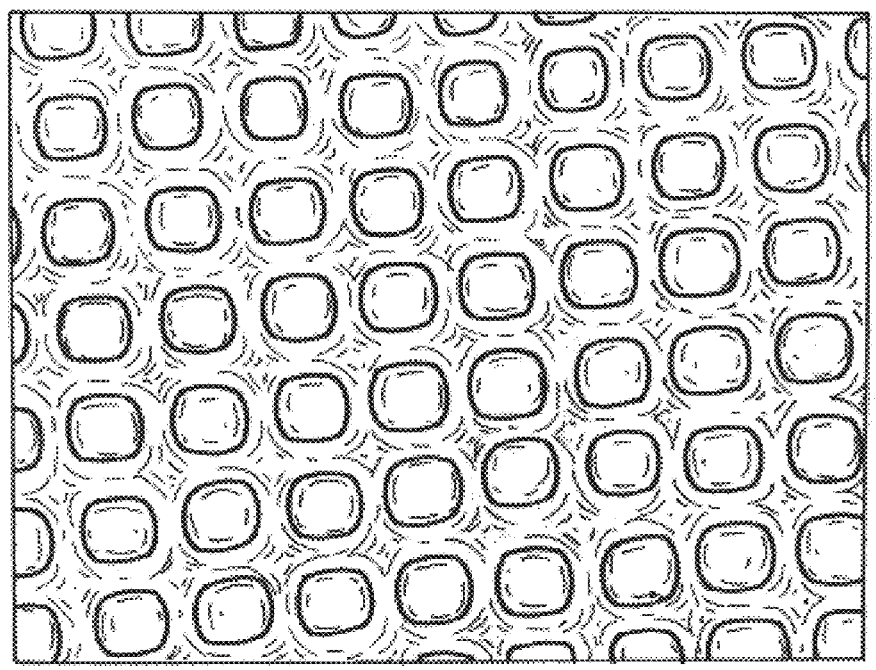
FIG. 9(b) is a drawing which is made on the basis of the above picture.

The configuration of the concavities and convexities formed on the glass substrate is shown in FIG. 9. Here, FIG. 9(a) is a picture of the plan view of the glass substrate processed, and FIG. 9(b) is a drawing which is made on the basis of the above picture. As is apparent from those drawings, the mask pattern having mesh distance of 50 μm is accurately transferred on the glass substrate. No cracking can be observed in the peripheral portion of any concavity. Further, the pattern of interference light of the diffraction beams can be observed at the period of more or less 1 μm. This means that the transferring of the pattern in the microscopic order of around 1 μm is possible. In this embodiment, a laser beam having a wavelength of 532 nm is applied, but a similar result can be obtained with a laser beam having a wavelength of 355 nm. Furthermore, the materials of the mask are not limited to copper, but other materials which have superior heat conductivity, such as aluminum, gold etc., and materials which have a high melting point, such as tungsten, stainless, steel, tantalum, etc. can be used. Here, the glass substrate, on which surface is transferred the mask pattern mentioned above, if treated by the process of filling the concavities with plastics of high refractive index, can be applicable as a microlens array which may be incorporated into a liquid crystal display device and/or a plasma display device.

EXAMPLE 4

Figure 10:
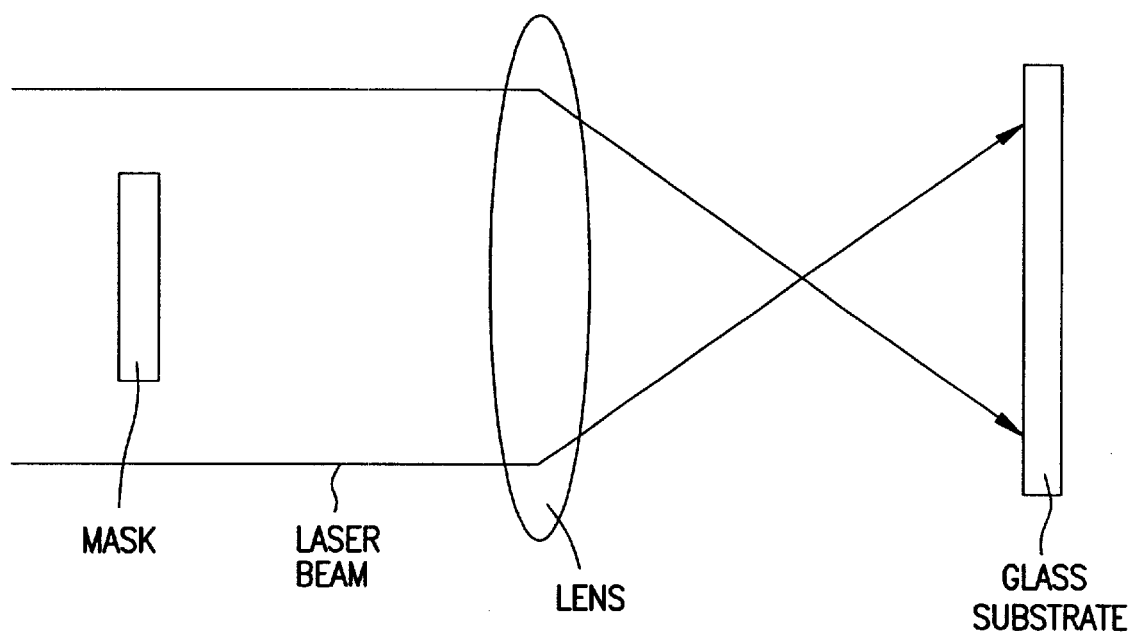
FIG. 10 is an outline drawing of another embodiment of the device for forming a mesh pattern with laser processing on the glass substrate.

In this embodiment, as shown in FIG. 10, without attaching the copper mask on the surface of the glass substrate, the laser beam is radiated on the glass substrate which is positioned on the optical path of the lens.

The kind of glass which is used, the condition for diffusing the Ag ions into the glass, and the used laser beam are same as for the above-mentioned example 3.

In FIG. 10, the glass is set at the position where a real image is formed by the lens (focus distance of 100 mm). In the same manner as in the embodiment 3, the ablation of the glass is acknowledged when the optical energy comes up to about 4 $J/cm^2$/pulse, and while keeping this condition, 10 pulses of the laser beam are radiated, and then the radiation of the laser beam is stopped.

Figure 11A:
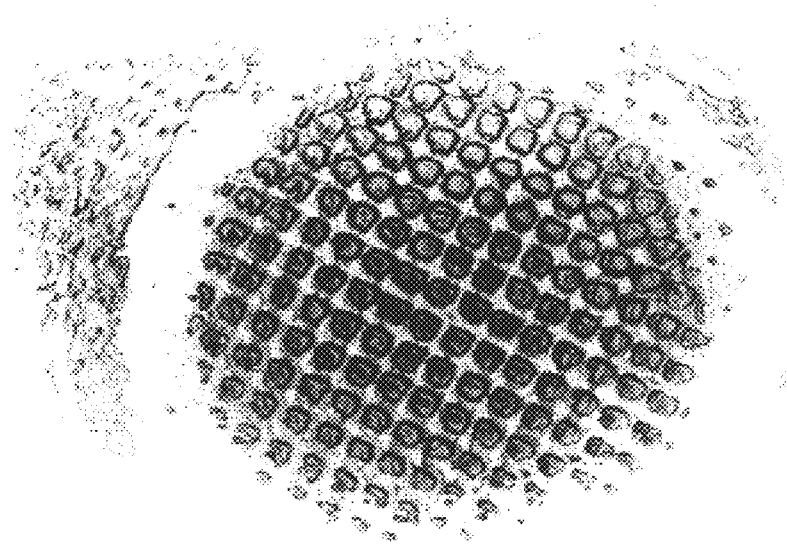
FIG. 11(a) is a picture of the surface of the glass substrate processed by the laser, observed by an optical microscope (×50)
Figure 11B:
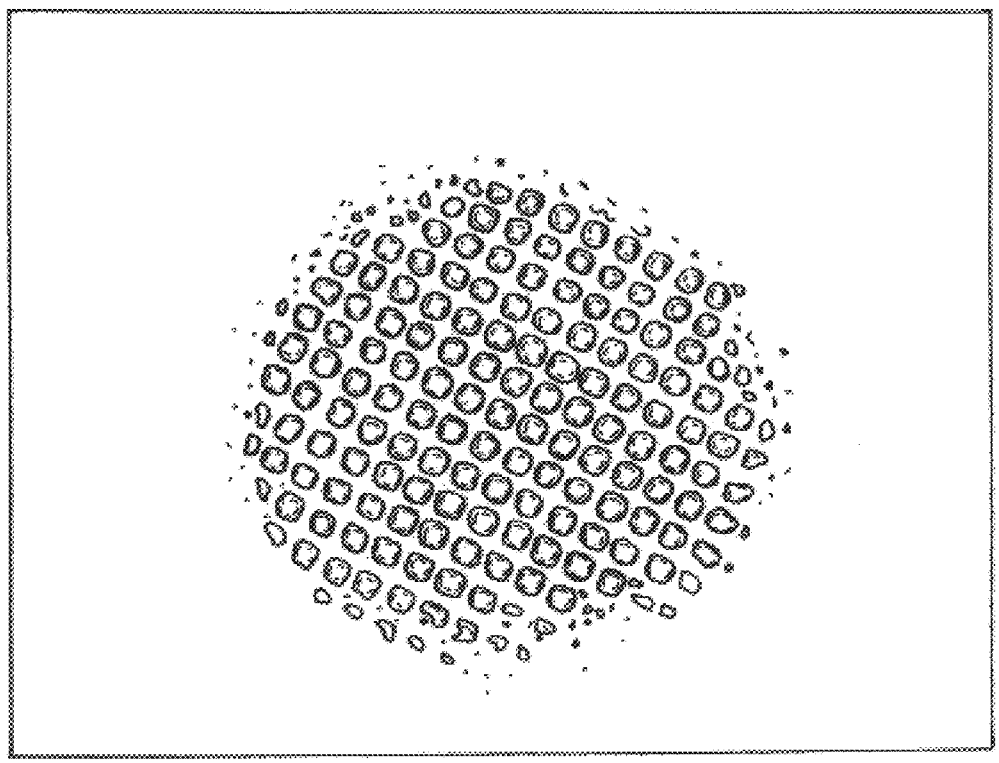
FIG. 11(b) is a drawing which is made on the basis of the above picture.

The configuration of the concavities and convexities formed on the glass substrate is shown in FIG. 11. Here, FIG. 11(a) is a picture of the plan view of the glass substrate processed, and FIG. 9(b) is a drawing which is made on the basis of the above picture. As is apparent from those drawings, the mesh is transferred on to the glass substrate in reduced size compared to that of the embodiment 3, in spite of using the same mask as the embodiment 3. In this way, reduction and enlargement of the transfer is possible by using the lens.

Figure 12A:
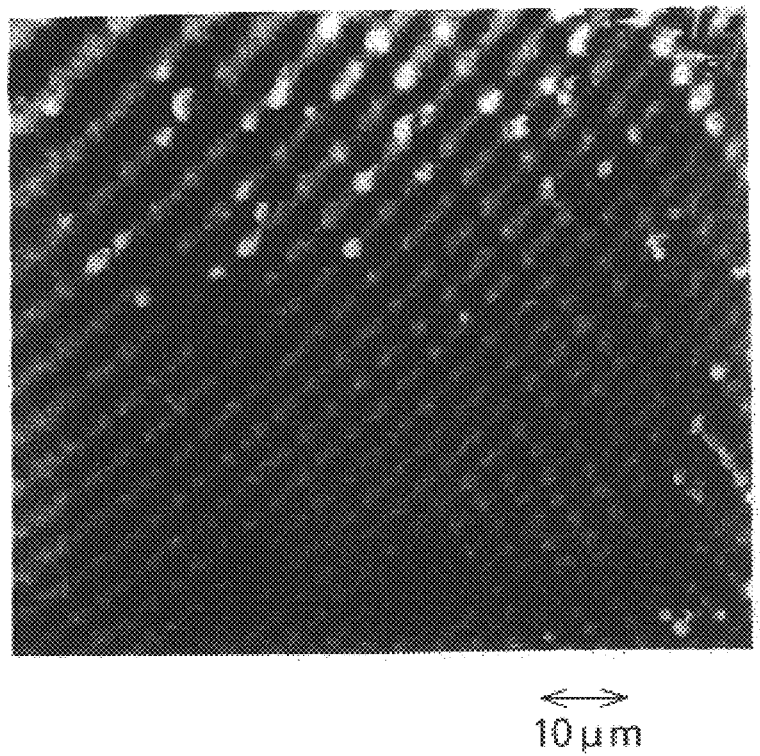
FIG. 12(a) is a picture of the surface of the glass substrate processed by the laser, observed by an interatomic force microscope.
Figure 12B:
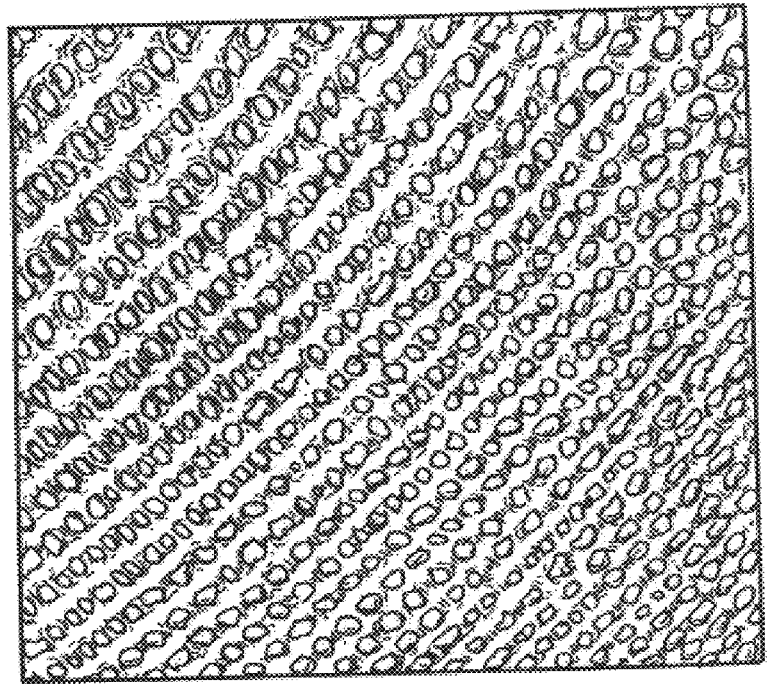
FIG. 12(b) is a drawing which is made on the basis of the above picture.

In the above, is described an example of manufacturing a glass substrate for use as a planar microlens array using a mask. A glass substrate for use as a microlens array can be formed by interfering three or more laser beams, as shown in FIGS. 12(a) and (b).

Here, in the embodiment, as the glass substrate, the silicate glass system containing $Al_2O_3$, $B_2O_3$, $Na_2O$, F and treated with the Ag ion exchange is disclosed, however, other glasses with the Ag ion exchange treatment, and even other glasses without the Ag ion exchange treatment, if they have processability by the laser, can be used as the object to be processed in accordance with the method of the present invention.

Moreover, the shape of the glass material as the object to be processed in accordance with the method of the present invention is not be limited to being sheet-like, but also the present invention is applicable to other shapes including cylinder like and so on.

EXAMPLE 5

Figure 13:
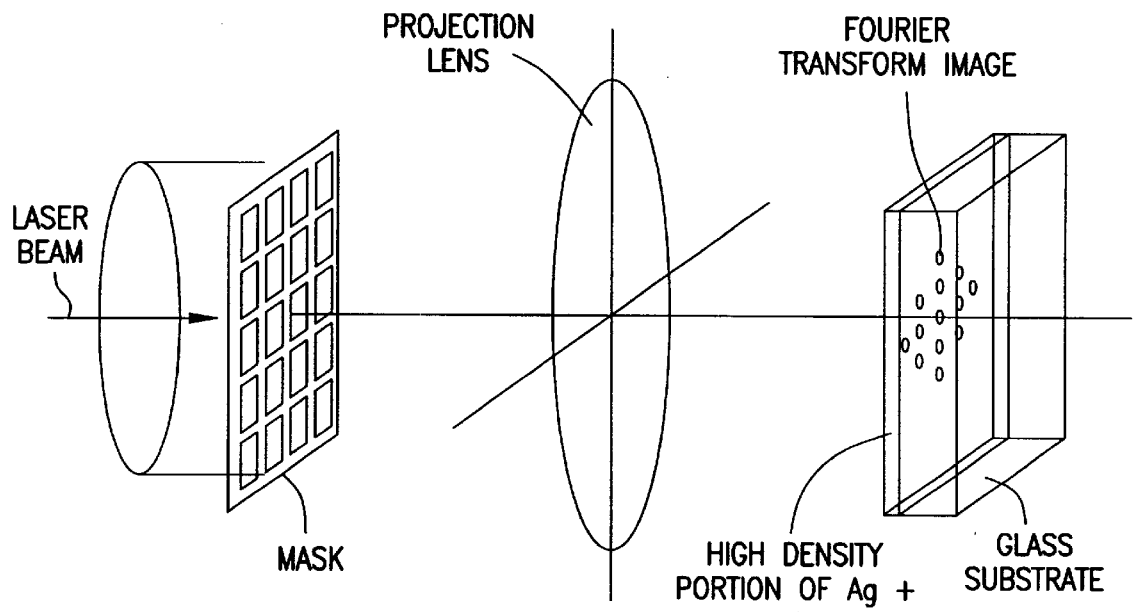
FIG. 13 is a drawing which shows an optical system for exercising another laser processing method according to the present invention.

FIG. 13 shows an optical system for exercising a laser processing relating to example 5, wherein the mask is positioned at the focus on the incident side of the projection lens and the glass substrate is positioned at the focus on the exit side of the projection lens.

As the glass substrate 3, the glass mainly containing $Al_2O_3$, $B_2O_3$, $Na_2O$, F, having a thickness of 2 mm, and being treated with the Ag ion exchange is used. The Ag ion exchange treatment is conducted in the following steps.

A molten salt comprising a mixture of 50 mol % of silver nitrate and 50 mol % of sodium nitrate was placed in a quartz container. Specimens of the glass substrate were immersed in the molten salt in the quartz container for 15 minutes. The molten salt was kept 300° C. in an electric furnace, and the reactive atmosphere was air.

By this treatment, Na ions in the surface of the glass substrate are eluted, diffusing Ag ions in the molten salt into the glass (ion exchange). The thicknesses of the layers into which the Ag ions were diffused, as measured by a microanalyzer, were about 5 μm.

As the laser beam source, the light beam of third highest harmonic wave of the Nd:YAG laser (wavelength: 355 nm, pulse width: 10 nsec, repetition frequency: 5 Hz) is used. The energy per one pulse of the laser beam is able to be adjusted by changing the timing of the Q switch of the laser. In the case of the laser beam which is used in this embodiment, the maximum pulse energy is about 90 mJ and the beam diameter thereof is about 5 mm.

A lens having a focus distance of 250 mm is used and as the mask is used a copper mesh constructed with a number of holes having a diameter of about 100 μm arranged in two dimensions.

In the above, upon the radiating of the laser beam, a Fourier transform image of the mask is formed on the surface of the glass substrate.

Figure 14A:
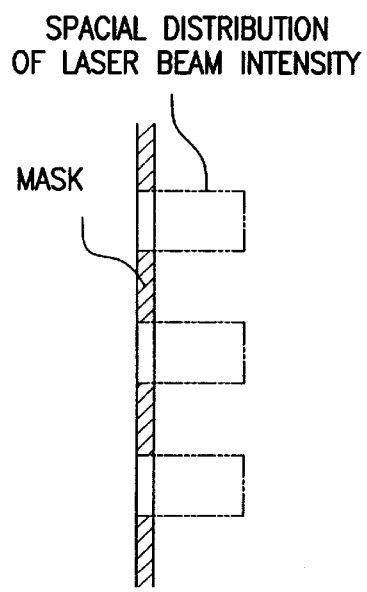
FIG. 14(a) is a drawing which shows the spacial distribution in the intensity of the laser beam which penetrates a mask.
Figure 14B:
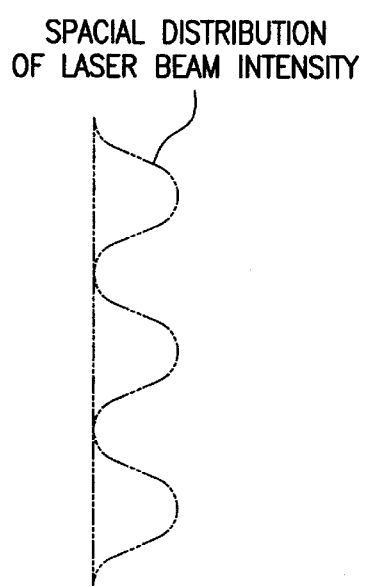
FIG. 14(b) is a drawing which shows the spacial distribution in the intensity of a Fourier transform image of the laser beam.

Here, the spacial distribution in the intensity of the laser beam when it penetrates the mask shows a rectangle, as shown in FIG. 14(a), where the intensity is nearly equal at the central and the peripheral portions. On the other hand, the spacial distribution in the intensity of the laser beam of the Fourier transform image shows a sinusoidal wave, as shown in FIG. 14 (b).

And, recess portions having a curved (arc-like) cross-section are formed on the surface of the glass substrate corresponding to the spacial distribution in the intensity of the laser beam. The evaporation or ablation by the laser beam is, generally, non-linear, thus, the evaporation does not occur until the laser beam exceeds a certain intensity. In the case of this embodiment, no evaporation nor ablation occurs regarding the components greater than 3 in the order of the Fourier transform image because the intensity is small.

However, even if using masks of the opening-type, the spots of higher than that in the order can be recorded or transferred, depending on the design of the masks.

EXAMPLE 6

Figure 15:
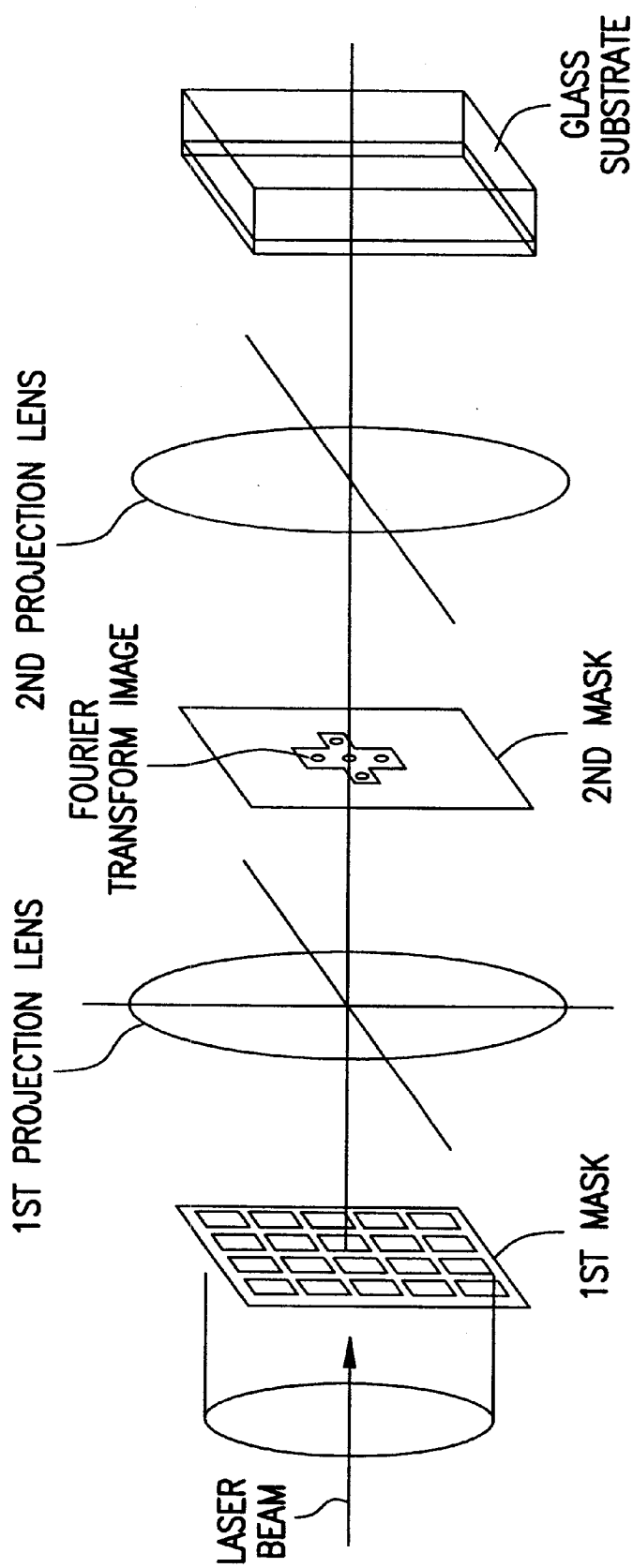
FIG. 15 is a drawing which shows another embodiment in the manner of FIG. 13.

FIG. 15 shows an optical system for exercising a laser processing relating to example 6, wherein the focus position of the exit side of the first projection lens is made coincident with the focus position of the incident side of the second projection lens, a first mask is positioned at the focus of the incident side of the first projection lens, a second mask is positioned at the focus of the exit side of the first projection lens, and the glass substrate is positioned at the focus of the exit side of the second projection lens.

The laser beam source, the first mask, the first and second projection lenses and the glass substrate, used are the same as those of the above embodiment 5.

In the above, upon the radiating of the laser beam, the spots of the orders except for 0 and 1 of the Fourier transform image are shut by the second mask, and only the image of the orders of 0 and 1 of the Fourier transform is made incident upon the second projection lens, where by an image is formed on the surface of the glass substrate. This image is such that the components in the orders of more than 2 are eliminated, and the cross-sectional configuration of the recess portion formed on the glass base is smoothly curved. The power of the image can be adjusted by changing the focus distances of the first and the second lenses.

Figure 16:
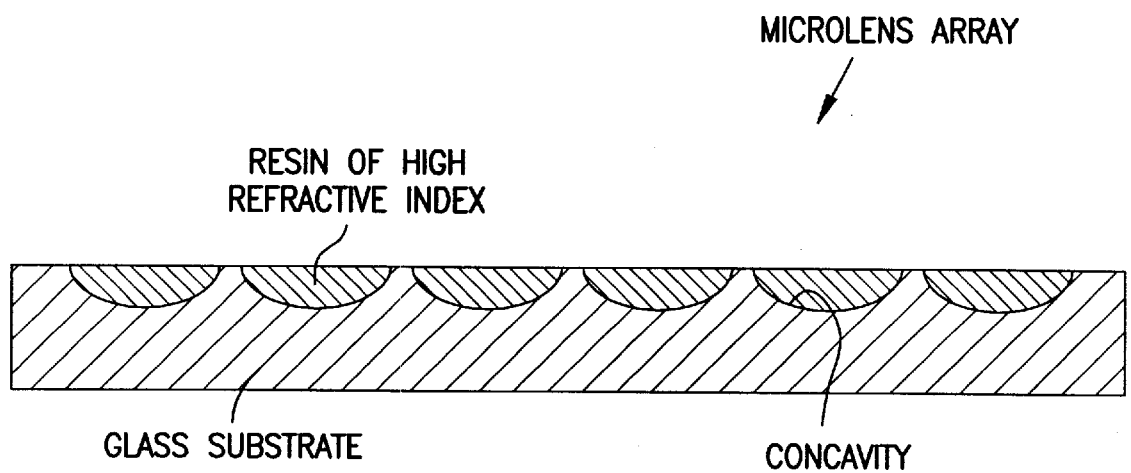
FIG. 16 is a cross sectional view of a planar microlens array using a glass substrate which has been manufactured in accordance with the laser processing method of the present invention.

FIG. 16 is a cross-sectional view of a planar microiens array, and the planar microlens array is constructed by filling plastic of high refractive index into the concavities of the glass substrate obtained by the above embodiments 5 and 6.

EXAMPLE 7

Figure 17:
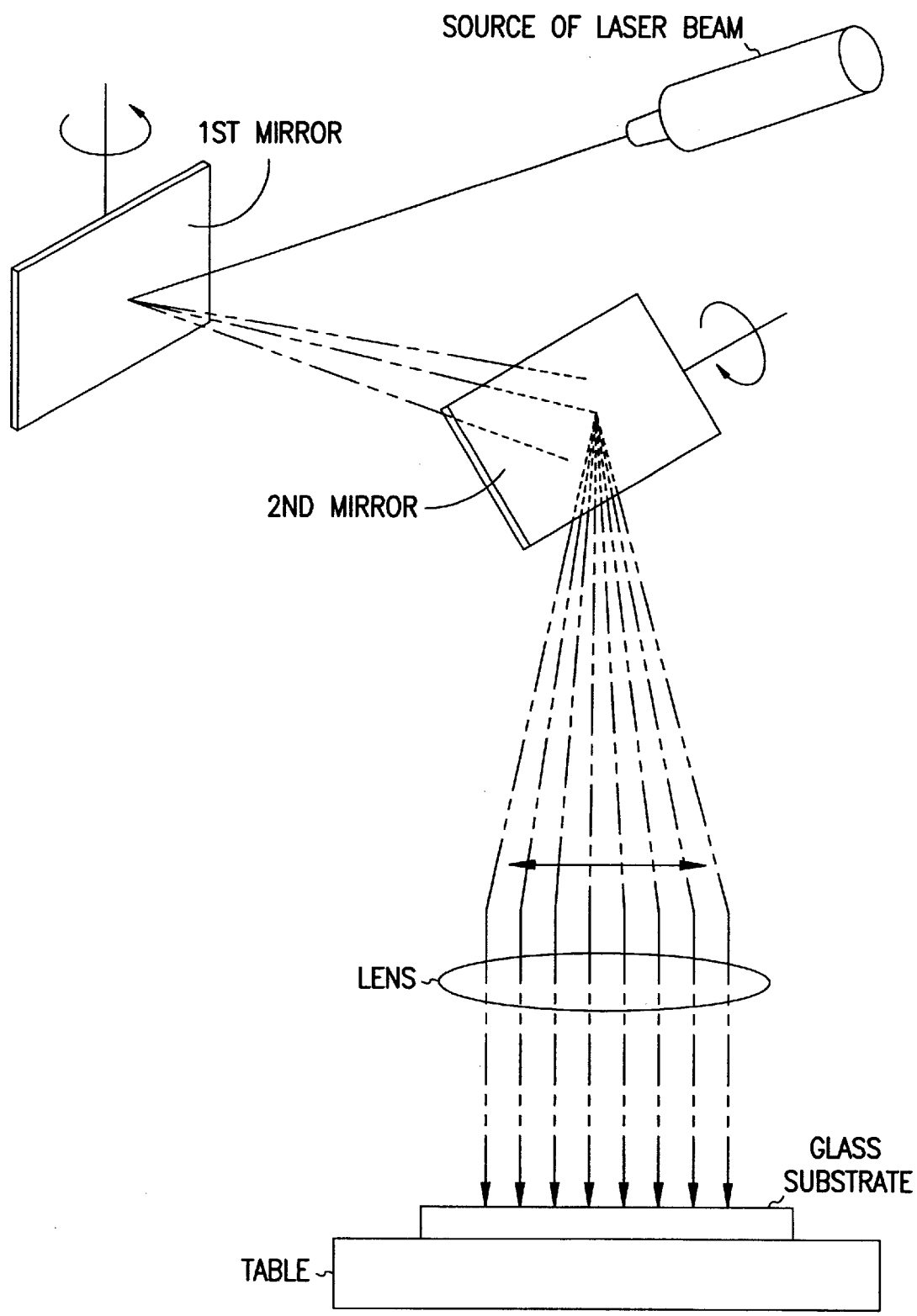
FIG. 17 is a drawing outlining construction of a processing device which is applied for exercising another laser processing method of the present invention.

FIG. 17 shows outlining construction of a processing apparatus which is applied for exercising the laser processing method of example 7. The processing device is constructed with a radiation source of a laser beam, a first mirror, a second mirror, a lens and a table on which a glass substrate of sheet shaped is mounted.

The first and the second mirrors are constructed with a galvano mirror which turns through a small amount of angle depending on the current conducting through it, and the first and the second mirrors are positioned so that the turning axes thereof cross or intersect at right angle. The lens is so positioned that the laser beam reflected by the second mirror is focused on the same plane, in this embodiment on the surface of the glass substrate.

Figure 18:
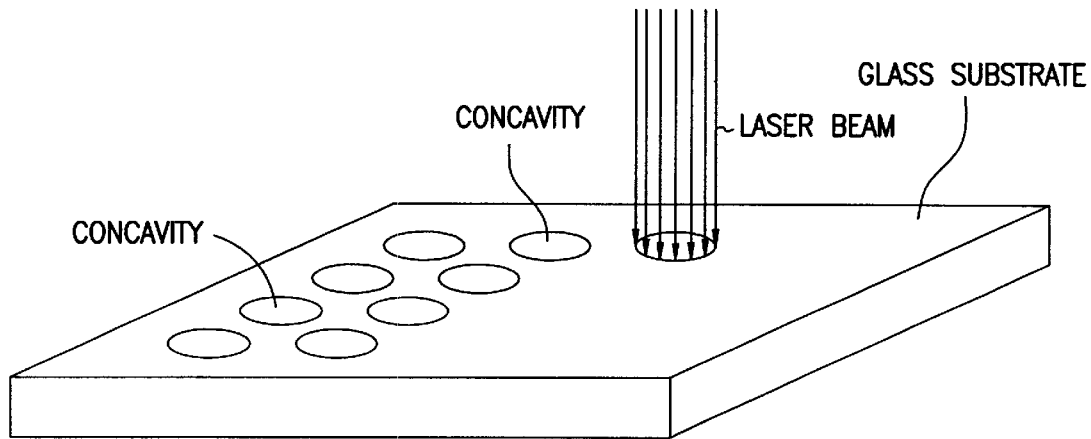
FIG. 18 is a perspective view of the glass substrate during the processing.

In the above, the spot position of the laser beam from the radiation source shifts in a X-direction on the surface of the glass substrate by rotating the first mirror, and the spot position of the laser beam shifts in a Y-direction on the surface of the glass substrate by rotating the second mirror Consequently, by combining those operations, it is possible to shift the spot position of the laser beam to any position on the surface of the glass substrate, whereby the concavities can be sequentially formed on the glass substrate at a constant distance as shown in FIG. 18.

Concretely, as the above glass substrate, the glass mainly contains SiO in addition thereto, $Al_2O_3$, $B_2O_3$, $Na_2O$, F, and has a thickness of 2 mm. The glass substrate was immersed in the molten salt (kept at 300° C.) including a mixture of 50 mol of silver nitrate and 50 mol % of sodium nitrate in the quartz container for 86 hours, thereby eluting Na ions in the surface of the glass substrate, and diffusing Ag ions in the molten salt into the glass. The thicknesses of the layers into which the Ag ions were diffused, as measured by a X-ray microanalyzer (XMA), were about 160 $\mu$m.

By mounting the glass substrate mentioned above and moving the spot position of the laser beam of wavelength of 355 nm, the third highest harmonic wave of the Nd:YAG laser, a plurality of concavities are formed on the glass substrate at a distance of 125 $\mu$m. The pulse width of the laser beam which is used is about 10 nsec, the repetition frequency thereof is 5 Hz, and the radiation energy per one pulse is 30 $J/cm^2$/pulse. One hundred pulses are shot to each one of the spots.

Figure 19:
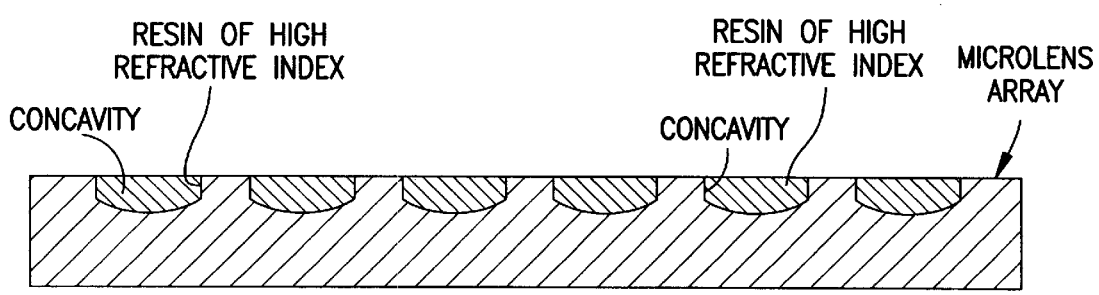
FIG. 19 is a cross-sectional view of the planar microlens array.

A planar microlens array can be produced by filling plastic of high refractive index into the concavities of the glass substrate obtained by the above embodiment, as shown in FIG. 19.

Figure 20:
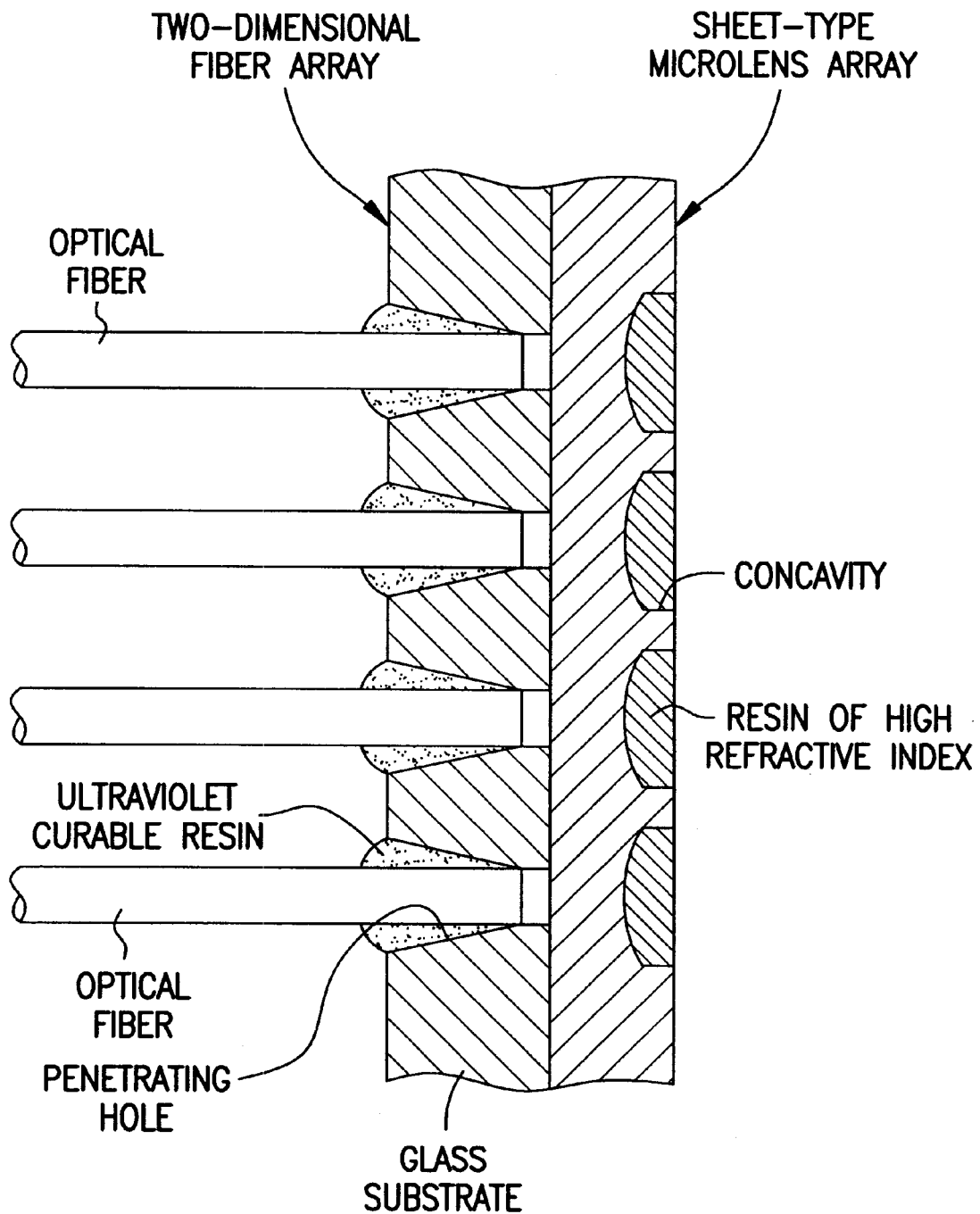
FIG. 20 is a cross-sectional view of a two dimensional optical fiber array.

FIG. 20 shows a two dimension optical fiber array constructed as one element combined with the above sheet-type microlens array. This two dimension optical fiber array also can be obtained by forming holes piercing the glass substrate by the laser beam, inserting the one ends of the optical fibers into the holes, then fixing them with plastic which is curable by ultraviolet radiation, in the same manner as the planer microlens array. With forming the piercing holes at the positions corresponding to the positions of the lens portions of the planar microlens array mentioned above, as shown in FIG. 20, the light beams incident upon the lens portions of the sheet-type microlens array are converged and enter into the optical fibers at the one end thereof.

As explained in the above, according to the present invention, under processing the glass by the laser beam, patterns can be very finely formed, compared to the conventional method, with very high accuracy and in less time, because the microscopic concavities and convexities can be formed on the surface of the glass substrate by partially varying the spacial distribution of the intensity of the laser beam, i.e., removing a greater amount of glass where the intensity is stronger, and less where the intensity is weaker.

Therefore, it is very effective when applying it to the process of manufacturing the diffraction grating, the planar microlens array, etc.

And according to the present invention, by disposing the glass substrate at the position of forming the Fourier transform image, it is possible to form a number of concavities spreading on the surface of the glass substrate in two dimensions, with smoothly curved lines including arc-lines in the cross-sectional view. Consequently, applying it to a planar microlens array, for example, it is possible to form a convex lens with high accuracy.

And according to the present invention, the Fourier transform image is formed on the glass substrate surface again after removing the high frequency components of the Fourier transform image once formed, whereby concavities having smoothly curved cross-sections can be obtained, though being the same to the first mask in the plane view. And, the power of the image can also be adjusted by changing the focus distances of the two lenses.

Once the pattern of concavities and convexities to be formed on the glass substrate has been determined, it is enough to produce the mask on the basis of said pattern, therefore any type of pattern can be formed easily.

And according to the present invention, in processing the concavities and convexities of predetermined pattern on the glass substrate by the laser beam, a spot Position of the radiated laser beam is moved by changing the optical path of the laser beam by the function of an optical path changing means, including mirrors, while fixedly mounting the glass substrate, whereby the microscopic pattern of the concavities and convexities can be formed on a surface of said glass substrate, with accuracy and in short time.

Since the table on which the glass substrate is mounted does not move, therefore, it is possible to suppress the generation of dust in the process and to increase productivity of the products.

Further, the optical path changing means is constructed with a first mirror for moving the spot position of the laser beam vertically on the surface of the glass substrate, and a second mirror for moving the spot position of the laser beam horizontally on the surface of the glass substrate, whereby any kind of concavities and convexities can be formed on the glass substrate. Moreover, by constructing the mirrors with galvano mirrors, it is possible to perform very fine processing.

In particular in the processing methods mentioned above, the glass substrate to be treated contains silver in the form of atoms, colloid or ions in it, and has a silver concentration showing the highest value on the top surface and gradually decreasing from the surface to the interior thereof, and therefore no cracking nor breakage occurs even if using a laser beam having a relatively long wavelength. And, with using the laser beam having a relatively long wavelength, no consideration is needed about the absorption of the laser beam in air, and the device itself becomes simple.

INDUSTRIAL APPLICABILITY

The laser processing method for the glass substrate according to the present invention is contributable to the fabrication of optical products, including a diffraction grating, a microlens array, etc. The diffraction grating according to the present invention can be incorporated in an optical coupler, a polariscope, a spectroscope, a reflector and amode transducer, etc., and the microlens array according to the present invention can be incorporated in a liquid crystal display device, etc.

What is claimed:

1. A laser processing method for a glass substrate, comprising radiating a laser beam on the glass substrate, absorbing energy of the laser beam into the glass substrate, and removing a part of the glass by melting, evaporation or ablation due to the energy, wherein microscopic concavities are formed on a surface of said glass substrate by changing the optical path of the laser beam with optical path changing means, thereby moving a spot position of the laser beam radiated on the surface of said glass substrate, wherein said optical path changing means comprises a first mirror for moving the spot position of the laser beam in a X-direction on the surface of said glass substrate, and a second mirror for moving the spot position of the laser beam in a Y-direction on the surface of said glass substrate, wherein said glass substrate contains silver in the form of Ag atoms, Ag colloid or Ag ions to a predetermined depth or as a whole from the surface, and has a concentration slope of the silver showing the highest concentration at the side surface to be processed and gradually decreasing to the other side surface thereof.

2. A laser processing method for a glass substrate as defined in claim 1, wherein radiating the glass substrate includes radiating a laser beam having a periodical distribution in the intensity thereof to provide periodical concavities and convexities on the surface of the glass substrate.

3. A laser processing method for a glass substrate as defined in claim 2, radiating the glass substrate includes varying the pulse energy of the laser beam to control the cross-sectional configuration of the periodical concavities and convexities.

4. A laser processing method for a glass substrate as defined in claim 1, wherein radiating the glass substrate includes radiating a laser beam having a wavelength greater than 193 nm.

5. A laser processing method for a glass substrate as defined in claim 1, wherein moving the spot position includes turning the first mirror by conducting a small amount of current through the first mirror.

6. A laser processing method for a glass substrate as defined in claim 1, wherein the predetermined depth is about 160 $\mu$m.

7. A laser processing method for a glass substrate, comprising:
providing a glass substrate with silver in the form of Ag atoms, Ag colloid or Ag ions to a predetermined depth or as a whole from the surface, and has a concentration slope of the silver showing the highest concentration at the side surface to be processed and gradually decreasing to the other side surface thereof;
radiating a laser beam on the glass substrate, absorbing energy of the laser beam into the glass substrate, and removing a part of the glass by melting, evaporation or ablation due to the energy; and
changing the optical path of the laser beam thereby moving a spot position of the laser beam radiating on the surface of the glass substrate to form microscopic concavities on a surface of the glass substrate.

8. The method of claim 7, wherein changing the optical path of the laser beam includes moving a first mirror that moves the laser beam in a first direction.

9. The method of claim 7, wherein providing the glass substrate includes diffusing silver to a depth of about 160 $\mu$m.

10. A laser processing method for a glass substrate, comprising:
providing a glass substrate with silver in the form of Ag atoms, Ag colloid or Ag ions to a predetermined depth and with a concentration slope of the silver showing the highest concentration at the side surface to be processed and gradually decreasing to the other side surface thereof;
radiating a laser beam on the glass substrate to form microscopic concavities on the side surface of the glass substrate.

11. The method of claim 10, wherein providing the glass substrate includes placing silver to a depth of about 160 $\mu$m.

* * * * *

UNITED STATES PATENT AND TRADEMARK OFFICE
CERTIFICATE OF CORRECTION

PATENT NO. : 6,470,712 B2
DATED : October 29, 2002
INVENTOR(S) : Tadashi Koyama et al.

It is certified that error appears in the above-identified patent and that said Letters Patent is hereby corrected as shown below:

<u>Column 10,</u>
Line 45, insert -- at -- after "kept".

<u>Column 11,</u>
Line 46, delete "microiens" and insert -- microlens --, therefor.

<u>Column 12,</u>
Line 10, delete "SiO" and insert -- $SiO_2$ --, therefor.
Line 13, insert -- % -- after "mol".

Signed and Sealed this

Eleventh Day of March, 2003

JAMES E. ROGAN
*Director of the United States Patent and Trademark Office*